Sept. 10, 1940.　　　F. S. WHEELER　　　2,214,630

OVEN

Filed March 4, 1939

WITNESSES:
E. A. McCloskey.
N. G. Hepler.

INVENTOR
Floyd S. Wheeler.
BY
W. R. Coley
ATTORNEY

Patented Sept. 10, 1940

2,214,630

UNITED STATES PATENT OFFICE 2,214,630

OVEN

Floyd S. Wheeler, Arlington, Va., assignor to Westinghouse Electric & Manufacturing Company, East Pittsburgh, Pa., a corporation of Pennsylvania Application March 4, 1939, Serial No. 259,853

11 Claims. (Cl. 219—35)

My invention relates to ovens, and more particularly to the control of the circulation of the heated atmosphere therein.

When using an oven for baking purposes, it is advisable, in some instances, to be able to apply an additional final application of heat to the top of the baking charge, such as cakes, pies, etc., to brown the upper surfaces thereof. In ovens known to the art, the top surface of the baking charge is browned by leaving the charge in the oven an additional length of time, or by having a larger heating unit than is absolutely necessary located in the upper portion of the oven to radiate heat downwardly. Such ovens do not afford a satisfactory control of the baking process for the charge located within the oven. However, by controlling the circulation of the heated atmosphere within the oven, in accordance with my present invention, it is possible to greatly reduce the size of the upper heating unit, and, at the same time, to more closely control and regulate the baking of the charge.

It is, therefore, an object of my invention to provide an oven having control means for selectively changing the direction of flow of heated air within the oven whereby an operator may reverse such flow so as to contact a charge placed within the oven from either the top or from the bottom.

A further object of my invention is to provide an oven having propelling means therein for forcing the circulation of the heated air within the oven in preselected paths.

Another object of my invention is to provide an efficient, inexpensive method of controlling the direction of flow of heated air within an oven for selectively "browning" the top of the charge, with the heated air being directed upon the top of the charge, or for baking the charge in a normal manner, with the heated air being directed upwardly against the bottom of the charge.

Still another object of my invention is to provide an oven having means therein for circulating the oven atmosphere and an interlocking mechanism associated with the oven door for preventing the circulation of the atmosphere when the door is open.

Other objects of my invention will either be pointed out specifically in the course of the following description of a device embodying my invention, or will be apparent from such description.

Figure 1:
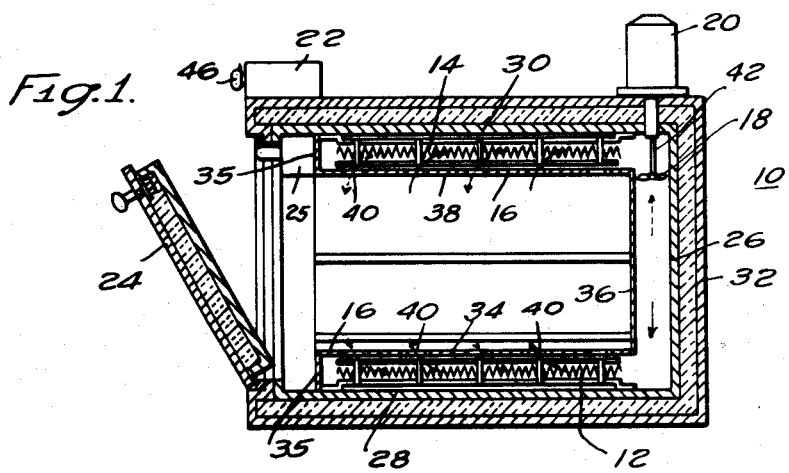
Figure 1 is a transverse sectional view of an oven embodying my invention.

Referring to the accompanying drawing, I show an oven 10 having electric heating units 12 and 14 located therein and a baffle plate structure 16 positioned over the heating units 12 and 14, and spaced inwardly from the inner walls of the oven 10. A propeller or air circulator 18 is positioned within the space between the baffle 16 and the walls of the oven 10, and is operatively associated with reversible motors 20, which is controlled by a suitable switch mechanism 22. An interlocking mechanism 25 is associated with the motors 20 and switch mechanism 22 for disconnecting the motors 20 when the oven door 24 is open.

The oven 10 comprises, in this instance, a box-like structure having an outer casing 32, a rear vertically extending inner wall 26, a lower horizontally positioned platform or inner wall 28, an upper inner wall 30 substantially parallel to the lower wall 28, and a door 24 hingedly attached to the front portion thereof. The door 24 is attached to the oven 10 by means of hinges (not shown) in any suitable manner. The door 24 is adapted to close the opening of the oven and to engage an interlocking mechanism 25 when in a closed position. The oven 10, hereinabove described and illustrated in the accompanying drawing, is merely illustrative and may be formed in any other suitable, desired shape.

The electric heaters 12 and 14 are positioned within the oven 10, the lower heater 12 being disposed upon the horizontal platform or lower inner wall 28, while the upper heater 14 is rigidly attached to the upper inner wall 30 substantially parallel to the lower heater 12 and such inner wall 30. The heaters 12 and 14 may be formed in any desirable manner, and may be attached to the oven structure in any suitable manner. In addition, it is to be understood that the heaters, both upper and lower, may be gas rather than electric.

The baffle plate 16 is located within the oven 10 and has a lower horizontal portion 34, a rear vertical portion 36, and an upper horizontal portion 38. The lower horizontal portion 34 is located over the lower heater 12 substantially parallel to the lower inner wall 28 and is spaced vertically above the wall 28 a distance slightly greater than the height of the heater 12. The upper horizontal portion 38 is positioned substantially parallel to and below the upper heater 14, and is spaced from the upper inner wall 30 of the oven 10, subsantially the same distance that the lower portion 34 is spaced above the lower inner wall 34. The rear portion 36 of the baffle plate 16 is displaced inwardly from the rear wall 26 of the oven 10 substantially the same distance that the horizontal portions 34 and 38 are positioned from the respective inner walls 28 and 30 of the oven 10.

It is therefore, obvious that the baffle plate 16 is located substantially an equal distance from and parallel to the lower platform 28, the rear wall 26, and top wall 30 of the oven 10. Vertically extending ends 35 and sides 37 are functionally integral with the baffle 16 and extend from the portions 34, 36 and 38 thereof to the inner walls 28, 26, 30, respectively of the oven 10. The baffle 16, including the ends 35 and sides 37, thus forms, in conjunction with the inner walls 28, 26 and 30 of the oven 10, a duct, within which the heated atmosphere of such oven may be circulated, as hereinafter described. Suitable apertures 40 are located within the horizontal portions 34 and 38 of the baffle 16. These apertures permit the passage of heated air therethrough as such air is circulated within the oven, as hereinafter described.

The propeller 18, in this instance of substantially the same structure as a fan blade, is located within the vertical space between the rear baffle 36 and the rear wall 26 of the oven 10, and is operatively associated with reversible motors 20 by means of shaft 42. In this instance, there are two propellers 18, one being shown in Fig. 1, one such propeller being driven by each of the two reversible motors 20 shown in Fig. 2. It is to be understood that the number, location and exact characteristics of the propellers 18 are immaterial for the purposes of this application, provided that there are located, within the space or duct between the baffle 16 and the inner walls of the oven, suitable propelling means for circulating the atmosphere of heated air, within the oven, in selective directions.

Figure 3:
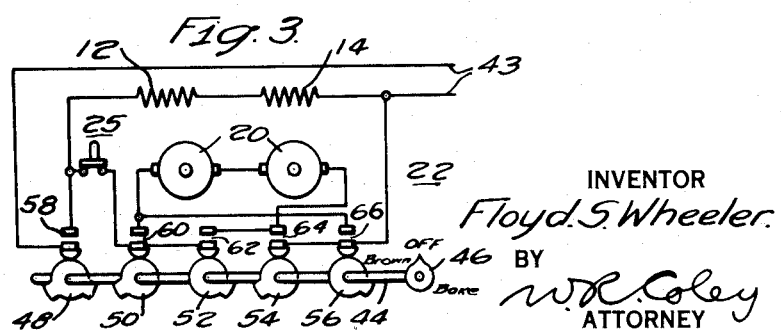
Fig. 3 is a schematic wiring diagram for effecting the desired control for the oven in accordance with my invention.

The motors 20 and heaters 12 and 14 are controlled by a suitable switch mechanism 22 (Fig. 3). The switch connects the heaters 12 and 14 to the circuit supply 43, and selectively reverses the motors 20. The switch 22 comprises, in this instance, a horizontally disposed shaft 44, a control knob 46, and a plurality of cams 48, 50, 52, 54 and 56, attached to the shaft 44, which control suitable contactors 58, 60, 62, 64 and 66. The contactors 60, 62, 64 and 66 connect the motors 20 to the supply circuit 43 in either of two directions, depending upon which way the handle 46 is rotated while the contactor 58 connects the heaters 12 and 14 to the supply circuit in either operating position of the handle.

With the switch positioned as illustrated in Fig. 3, in which all the contactors are in a disengaged position, neither the motors nor the heating elements 12 and 14 will be connected to the supply circuit. However, if the switch be rotated, say, clockwise to the "bake" position, cams 48, 50 and 54 will cooperate with the contacts 58, 60 and 64, respectively. Contact 58 will connect the heating elements 12 and 14 to the power supply, while contacts 60 and 64 will connect the motors 20 to the supply circuit through the interlocking mechanism 25, whereupon the motors will run in a given direction, it being assumed that the door 24 is closed and the interlock 25 is in an engaged position.

Figure 2:
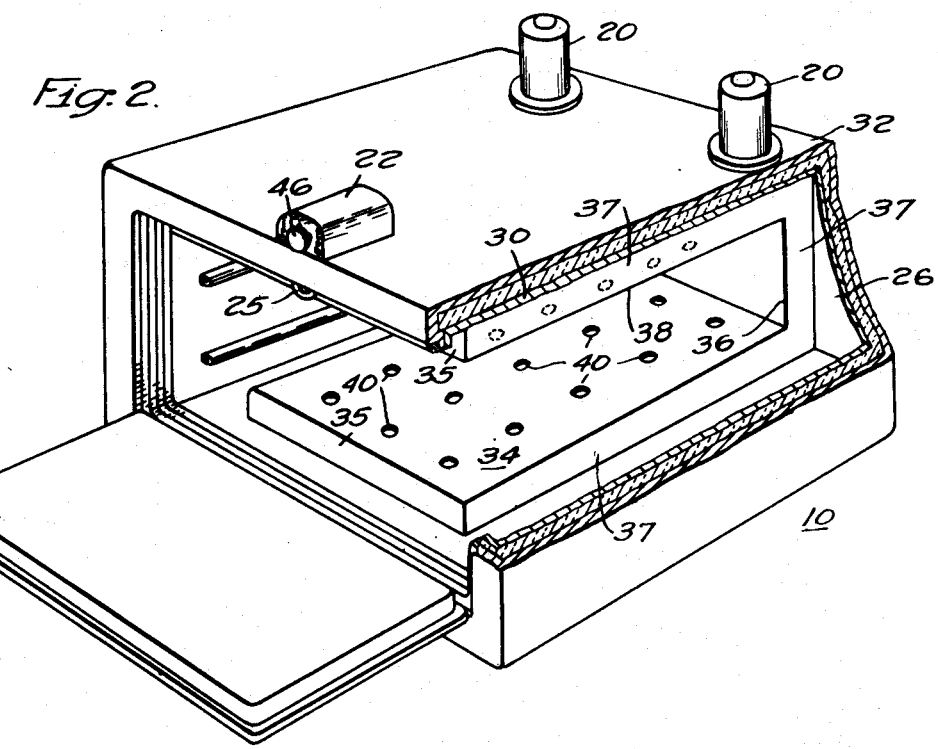
Fig. 2 is a perspective view of the oven shown in Fig. 1 with the oven door fully opened.

With the switch 22 in a "bake" position as hereinabove described, the propeller 18 will rotate so as to propel or circulate the heated atmosphere within the oven in a clockwise direction, as shown by the solid arrows in Fig. 1. The atmosphere will be directed upwardly through the oven across the upper heater 14, down the rear space between the baffle 36 and inner wall 26, across the lower heater 12, and upwardly through the inner portion of the oven. This circulation of the air will be maintained during the baking operation.

When it is desired to brown the top surfaces of pies or cakes or sear a roast positioned in the oven, the handle 46 of switch 22 will be rotated in a counterclockwise direction so that it will be located in its second operative position, marked "Brown". The cams 48, 52 and 56 will then cooperate with contacts 58, 62 and 66, respectively, causing them to be moved into an engaged position. The heaters 12 and 14 will accordingly again be connected to the supply circuit 43, whereas the contactors 62 and 66 will connect the motors 20 to the supply circuit in a reverse direction, causing the motors to run in a reverse direction.

The above reversing control for the motor is described as illustrative of one method by which the direction of circulation of the air in the cooking space may be reversed. With different types of motors a different reversing switch suited to the motor would be necessary, but such control devices are well known and will not be described here.

The propellers 18 will, due to the reverse rotation of the motors 20, rotate in a reverse direction. Accordingly, the heated atmosphere within the oven 10 will be circulated in a counter-clockwise direction as indicated by the dotted arrows, down across the lower heater 12, up between the rear portion 36 of baffle 16 and inner wall 26, across the upper heater 14, and downwardly through the cooking portion of the oven 10. With such a rotation of the heated atmosphere within the oven, a blast of heated air will be directed upon the top surface of the charge located within the oven. This downward movement of heated air within the oven will cause the upper surface of the charge, such as cakes, pies, roasts, etc., to become brown. The operator need only permit the motors 20 to run in this reverse direction long enough to secure the desired brownness of the upper surface of the charge before removing such charge from the oven.

It is, therefore, obvious that by having a baffle structure located over the heating units and about the inner walls of the oven and spaced inwardly therefrom, a reversible propelling device located between the baffle and the inner walls may be utilized to selectively circulate the heated atmosphere within the oven in predetermined directions. In addition, it is obvious that, by utilizing the interlocking mechanism 25 operatively associated with the door 24, the motors 20 will be stopped regardless of their direction of operation, whenever the door is opened, so that circulation of the heated atmosphere within the oven will likewise be stopped, preventing such heated atmosphere from being forced out of the oven as the doors are opened.

It is to be understood that the use of the electric heaters 12 and 14, as hereinabove described, is merely illustrative and that any desired type of heaters, such as gas or oil burners, or the like, may be used in lieu thereof.

Various further modifications may be made in the device embodying my invention without departing from the spirit and scope thereof, and I desire, therefore, that only such limitations shall be placed thereon as are imposed by the prior art and the appended claims.

I claim as my invention:

1. In an oven including a cooking space having heating means associated therewith for heating the atmosphere within the oven, means for circulating the heated atmosphere within the space in one general vertical direction, and means for reversing the direction of said circulation.

2. In an oven including a cooking space having heating means asociated therewith for heating the atmosphere within the space, propelling means associated with the oven for circulating the atmosphere in one general vertical direction through said space, and means for reversing the direction of said circulation.

3. In an oven including a cooking space, a duct extending from the top to the bottom of the space, the walls of said duct having openings into the oven adjacent the top of the duct and adjacent the bottom thereof, means to circulate the air in the duct and through said space in one general vertical direction, and means to reverse the circulation of the air.

4. In an oven including a cooking space having a heating unit located therein, a baffle plate structure disposed inside the oven and enclosing said heating element, said baffle structure forming a duct from the top to the bottom of said oven and having openings near the top and near the bottom of the oven, means to circulate air through the duct and through the cooking space in one general vertical direction, and means to reverse the circulation of the air.

5. In an oven including a cooking space having a heating unit located therein, a baffle plate spaced from the top wall and having openings into the oven chamber, a baffle plate spaced from the bottom wall and having openings into the oven chamber, a duct connecting the two baffle plates, propeller means for circulating air through the duct between the baffle plates and through the cooking space in one general vertical direction, and means for reversing the circulation of the air.

6. In combination, an oven including a cooking space, a heating unit positioned within the oven, a baffle positioned over the unit and forming with the top, bottom and at least one side wall, an air duct leading from the top to the bottom of the oven, rotating means positioned upon the oven, a propeller positioned within the air duct and operatively associated with the rotating means for circulating the oven air over the heating unit and into the bottom portion of the cooking space, and means to reverse the rotating means for circulating the oven air over the heating unit and into the top portion of said cooking space.

7. In combination, an oven including a cooking space, an oven door, a heating unit positioned within the oven, a baffle positioned over the unit and forming with the top, bottom and at least one side wall, an air duct leading from the top to the bottom of the oven, rotating means positioned upon the oven, a propeller positioned within the air duct and operatively associated with the rotating means for circulating the oven air over the heating unit and into the bottom portion of the cooking space, means to reverse the rotating means for circulating the oven air over the heating unit and into the top portion of said cooking space, and an interlock operatively associated with the oven door and the rotating means for preventing the operating of the propeller when the door is open.

8. In an oven including a cooking space, an inner lining having top, bottom and back walls spaced from the corresponding oven walls forming an air duct from the top to the bottom of the oven, said top and bottom walls of the lining having openings therein, heating means between the top spaced walls and between the bottom spaced walls, propeller means for circulating air through said duct and through the cooking space in a general vertical direction, and means for reversing the direction of circulation of the air.

9. In an oven including a cooking space, an inner lining having top, bottom and back walls spaced from the corresponding oven walls forming an air duct from the top to the bottom of the oven, said top and bottom walls of the lining having openings therein, heating means between one pair of said spaced walls, propeller means for circulating air through said duct and through the cooking space in a general vertical direction, and means for reversing the direction of circulation of the air.

10. In an oven including an oven door and a cooking space having heating means associated therewith for heating the atmosphere within the oven, means for circulating the heated atmosphere within the space in a general vertical direction, means for reversing the direction of said circulation, and means operative upon opening the oven door for stopping said circulating means.

11. In an oven including an oven door and a cooking space having heating means associated therewith for heating the atmosphere within the oven, electrically operated means for circulating the heated atmosphere within the space in a general vertical direction, means for reversing the direction of said circulation, and switch means operative upon opening the door for cutting off power to said electric operated means.

FLOYD S. WHEELER.